(12) United States Patent
Inoue et al.

(10) Patent No.: US 6,478,695 B1
(45) Date of Patent: *Nov. 12, 2002

(54) GOLF BALL AND METHOD OF MANUFACTURE

(75) Inventors: Michio Inoue, Chichibu (JP); Keisuke Ihara, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 259 days.

This patent is subject to a terminal disclaimer.

(21) Appl. No.: 09/702,735

(22) Filed: Nov. 1, 2000

Related U.S. Application Data

(62) Division of application No. 09/188,881, filed on Nov. 10, 1998, now Pat. No. 6,190,597.

(30) Foreign Application Priority Data

Nov. 21, 1997 (JP) ............................................. 9-338079

(51) Int. Cl.[7] ........................... A63B 37/04; A63B 37/06
(52) U.S. Cl. ........................ 473/373; 473/374; 473/376; 473/371
(58) Field of Search ................................. 473/367, 368, 473/370, 371, 373, 374, 376, 377

(56) References Cited

U.S. PATENT DOCUMENTS

| 5,578,256 A | | 11/1996 | Austin |
| 5,713,802 A | | 2/1998 | Moriyama et al. |
| 5,730,663 A | | 3/1998 | Tanaka et al. |
| 5,779,562 A | * | 7/1998 | Melvin et al. ............... 473/373 |

* cited by examiner

Primary Examiner—Jeanette Chapman
Assistant Examiner—Alvin A. Hunter, Jr.
(74) Attorney, Agent, or Firm—Sughrue, Mion, Zinn, Macpeak & Seas, PLLC

(57) ABSTRACT

A golf ball has a core and a cover and, the cover includes at least one thin spherical layer with a thickness of not more than 1.5 mm. The thin layer is molded by injecting an injection molding material at a selected fill speed which is correlated to the melt flow rate of the molding material. The invention facilitates the mass production of golf balls having thin spherical cover layers of uniform thickness which offer potential for further improvements in ball performance.

3 Claims, 2 Drawing Sheets

GOLF BALL AND METHOD OF MANUFACTURE

This is a divisional of application Ser. No. 09/188,881 filed Nov. 10, 1998, now U.S. Pat. No. 6,190,597, issued Mar. 14, 2000 the disclosure of which is incorporated herein by reference.

BACKGROUND OF THE INVENTION

1. Field of the Invention

This invention relates to a golf ball comprising a core and a cover having at least one thin spherical layer, and a method for manufacturing the same.

2. Prior Art

Solid golf balls constructed of a polybutadiene rubber core at the center and a spherical cover made of ionomer resin on the outside are in widespread use today. There has been a trend in recent years toward specific combinations of two or three layers in the cover, each made of a distinctive material. The aim is two-fold: to approach more closely a A level of performance which both incorporates such desirable features of thread-wound balls as their good spin receptivity and the easier control they allow over where the ball stops after it has been hit and also provides the longer carry of the solid balls, and to further increase the ball's carry. Moreover, within the limit imposed by regulations on the outside diameter of the ball, the core which generates most of the rebound energy that powers the ball's flight must have the largest volume possible. This set of circumstances has given rise to a need for thinner molded covers than in the past.

When solid golf balls first appeared, development began with two-piece balls made of a core and a one-layer cover. The cover was composed of a single layer of ionomer resin that was formed, separately from the core, into a pair of half-cups in a mold, then placed over the core and molded integrally with the core in another mold. For this reason, the thickness of the cover was generally set at about 2.0 mm (0.0787 in.). Later, covers came to be molded with injection molding machines by injecting resin about the periphery of a core positioned at the center of a spherical mold. Because the cover thickness was maintained at the preexisting value of about 2.0 mm (0.0787 in), there was no need to make the injection molding machine fill speed particularly rapid. Thus, given a melt flow rate (MFR) at 190° C. of from 1 to 10 for the injection molding material, the standard practice has been to set the fill speed for molding one ball at from 10 to 20 cm$^3$/s (0.6102 to 1.2205 in$^3$/s).

However, as noted above, when the number of layers in the cover increases to two or more and it becomes necessary to reduce the thickness of individual layers, the injected layers of resin are thinner so that they cool more rapidly. At the above-indicated range of fill speed in the injection molding machine, curing begins to arise before the resin for a given layer has extended over the entire surface of the core. This raises the possibility that the thin layer will not have a uniform thickness over the peripheral surface of the ball.

Although attempts have been made to adjust the properties of the molding material and the mold fill speed by trial and error, not only is such adjustment difficult, excessive modification of these parameters sometimes leads to a decline in ball performance and an increase in the level of production defects.

SUMMARY OF THE INVENTION

It is therefore an object of the present invention to provide a golf ball, and a method for its manufacture, in which an injection molding material is injection molded at an optimum fill speed to form a thin spherical cover layer, thereby enabling good adaptability to future improvements in ball performance, minimizing production defects in golf balls having thin spherical layers, and ensuring that thin spherical layers of uniform thickness are formed from particular molding materials used.

The invention provides a golf ball comprising a core and a cover enclosing the core, the cover having at least one thin spherical layer with a thickness of not more than 1.5 mm (0.0591 in.). The thin layer has been injection molded from an injection molding material under conditions which satisfy formula (1):

$$V \geq (a/t^2) - b \tag{1}$$

wherein V is the injection molding material fill speed in cubic centimeters per second, t is the thickness of the thin spherical layer in millimeters, $a = 0.04M^2 - 3.75M + 137.5$, and $b = -1.49/M - 0.57$, and M is the melt flow rate at 190° C. of the injection molding material for the thin spherical layer.

The invention provides also a method of manufacturing the foregoing golf ball, which method comprises injection molding the thin spherical layer from an injection molding material under conditions that satisfy above formula (1).

In the golf ball of the invention, a thin spherical layer is-injection molded about a core by means of an injection molding machine in which the filling velocity v (cm$^3$/s) of the injection molding material has been set at a value not less than the lower limit value defined by formula (1) above. The thin spherical layer can thus be formed to a very thin and uniform thickness of not more than 1.5 mm (0.0591 in.), making it possible to obtain a golf ball having a large core diameter and a plurality of thin spherical cover layers. This ball construction provides a large coefficient of restitution that increases the carry of the ball and can also generate or maintain a spin rate close to that of a thread-wound ball.

To arrive at formula (1), injection molding was repeatedly carried out using materials having various melt flow rates (MFR) while successively reducing the injection molding machine fill speed for each of various gap sizes between the inner face of the injection mold and the core, representing different thin spherical layer thicknesses, set by varying the core diameter, and the filled state of the thin spherical layer in each case was investigated. Based upon the results obtained, a limit fill speed was determined at which there do not arise areas in the mold unfilled with the thin spherical layer material or marked irregularities in the thickness of the thin spherical layer. Accordingly, such unfilled areas and thickness irregularities do not occur when injection molding is carried out using a fill speed equal to or greater than the value calculated in formula (1).

The melt flow rate (MFR) 1 ng/10 mm represents the ease with which a molding material that has been heated and melted flows within the runners in the mold when forced out by the injection molding machine. This value is measured with a commercial melt indexer. A higher value indicates that the material flows more easily.

Based on correlation diagrams obtained from our experiments, we have found that, to produce thin spherical cover layers in the manufacture of golf balls, the optimal practical range in the melt flow rate at a material temperature of 190° C. is 0.5 to 50. Our results confirm that at a melt flow rate of less than 0.5, the material flows with greater difficulty, making it necessary to set the injection molding machine to an extremely high fill speed. On the other hand, a melt flow rate of more than 50 may result in the formation of numerous burrs. Accordingly, it is preferable for the melt flow rate of the injection molding material used to form the thin spherical layer in the golf ball of the present invention to be selected within a range of 0.5 to 50.

In the manufacture of high-performance balls, the fill speed V (cm$^3$/s) of the injection molding machine which injects the material that forms the thin spherical cover layer is defined by formula (1):

$$V \geq (a/t^2) - b \qquad (1)$$

wherein t is the thickness of the thin spherical layer in millimeters, a and b are variables dependent on the thickness t (mm) of the thin spherical layer molded and the melt flow rate of the material. Hence, areas that are incompletely filled with the thin spherical layer material and irregularities in the thickness of this layer do not arise on the ball periphery due to an insufficient fill speed. This also eliminates excessive adjustments in material properties in an attempt to increase the fluidity of the molten material, thereby making it possible to reduce production defects and prevent a decline in ball performance.

While the lower limit value in the fill speed is fixed by above formula (1), the fill speed may be set at any value above this lower limit that can be empirically determined in accordance with the injection capability and mold capability (including heating capability, thermal conductivity, type of runner system, and number of balls produced per mold) of the injection molding machine used.

BRIEF DESCRIPTION OF THE DRAWINGS

The objects, features and advantages of the invention will become more apparent from the following detailed description.

DETAILED DESCRIPTION OF THE INVENTION

Figure 1:
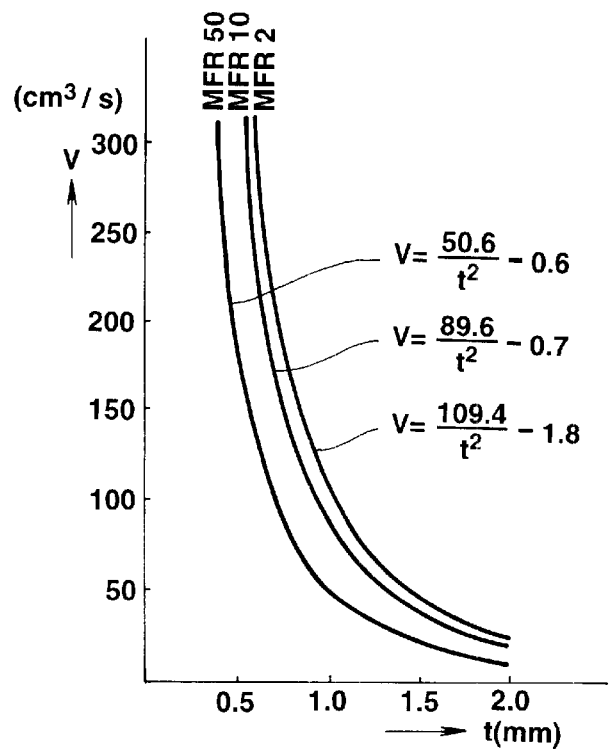
FIG. 1 is a graph plotting the thickness t of the thin spherical layer versus the fill speed V of the injection molding material.

The golf balls of the present invention are comprised of a core and a cover which encloses the core. The core may be a thread wound core comprising a liquid or solid center about which has been wound a rubber thread, or it may be a solid core. In the latter case, the solid core may be either a single core or a multi-core having a plurality of layers. These cores may be formed by known methods from known materials, and may have any suitable diameter.

The cover may be a one-layer cover of a multilayer cover. At least one layer in the cover is a thin spherical layer having a thickness of not more than 1.5 mm (0.0591 in.), preferably from 0.6 to 1.2 mm (0.0236 to 0.0472 in.), and more preferably from 0.8 to 1.0 mm (0.0315 to 0.0394 in.). A cover having a multilayer construction composed of a plurality of such thin spherical layers is especially preferred in this invention. The cover may be made of any suitable material. The thin spherical layer is generally formed of an ionomer resin, although use may also be made of various other thermoplastic elastomers, or mixtures of ionomer resins and thermoplastic elastomers.

The injection molding material that forms the thin spherical layer preferably has a melt flow rate at 190° C. of 0.5 to 50. At less than 0.5, the material has difficulty flowing, which may make it necessary to set the fill speed at an extremely high value, whereas a melt flow rate of more than 50 tends to result in burr formation. Hence, selection and use of a material having a melt flow rate within the above range is recommended.

In this invention, the above-described thin spherical layer is formed to a thickness of not more than 1.5 mm (0.0591 in.) by injection molding under conditions that satisfy this formula (1):

$$V \geq (a/t^2) - b \qquad (1)$$

wherein v is the injection molding material fill speed in cubic centimeters per second, t is the thickness of the thin spherical layer in millimeters, a=0.04M$^2$−3.75M+137.5, and b=−1.49/M−0.57, and M is the melt flow rate at 190° C. of the injection molding material for the thin spherical layer. Then, the thin spherical layer can be uniformly injection molded even when the thickness of the layer is 1.5 mm (0.0591 in.) or less.

That is, according to this invention, when the thin spherical layer material is injected, the fill speed V (cm$^3$/s) can be adjusted to achieve the desired thin spherical layer thickness t (mm) and at the same time, optimized in accordance with the melt flow rate M at 190° C. of the thin spherical layer material being used. In addition, the thickness t (mm) of the thin spherical layer to be formed can be adjusted according to the fill speed and the melt flow rate of the thin spherical layer material. For all combinations within the scope of the invention, a spherical layer characterized by thinness and molded quality can be formed on the core surface. In addition, molding defects owing to insufficient fill speeds often found in the prior art, such as areas on the core surface that are incompletely filled with the thin spherical layer material and irregularities in the thickness of this layer, are minimized. There is no longer a need for extra adjustments in the material properties simply to increase the flow of the material. These enable molding defects to be minimized. Moreover, the invention provides good adaptability to new developments for improved performance, such as thinner and larger numbers of cover layers, as can be seen in recent golf ball developments targeted mainly at thin spherical layers.

The injection molding equipment including an injection molding machine and injection mold used in the practice of the invention may be any known equipment of this type customarily used in golf ball production.

EXAMPLE

An example of the invention is given below by way of illustration while referring to the diagrams, and is not intended to limit the invention.

While using various materials having different melt flow rates at 190° C. (in the present example, ionomer resins having different melt flow rates were used for each layer) and successively varying the outside diameter of the core positioned at the center within a golf ball mold, the thin spherical layer material was injected by an injection molding machine into the gap between the inner wall of the mold and the outer periphery of the core to form a thin spherical layer, thereby empirically determining the limits in the fill speed at which there arose areas within the gap that remained unfilled by the molding material. That is, for each gap, and thus each thin spherical layer thickness, set by changing the core diameter, we carried out injection molding at different fill speeds ranging from high speeds to low speeds, and determined the limit fill speed at which unfilled areas arose. Unfilled areas were detected by peeling the outer layer off the ball after molding, and visual examination.

The limit fill speeds for each thin spherical layer thickness that were determined in this way for the ionomer resins used in the present example are plotted on a graph in FIG. 1.

Figure 2:
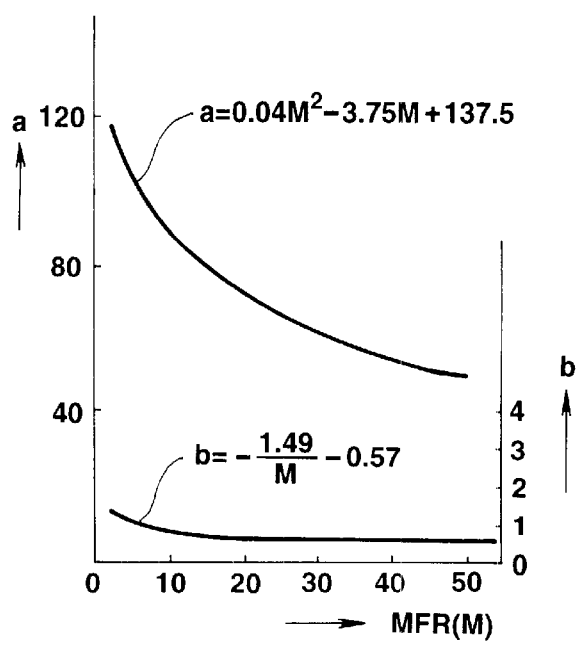
FIG. 2 is a graph of the melt flow rate (MFR) versus the a and b values.

It is apparent in FIG. 1 that the relationship between the limit fill speed V (cm$^3$/s) at which unfilled areas do not arise and the thickness t (mm) of the thin spherical layer is approximately expressed by V=(a/t$^2$)–b for the melt flow rate M of each material used. In the formula, a and b are variables which are dependent on the melt flow rate of the material. The relationships of a and b with the melt flow rate M can be expressed as the approximations shown in FIG. 2.

Described below is the procedure for manufacturing a golf ball according to the invention in which a plurality of thin spherical layers of uniform thickness are disposed about the periphery of the core without any reduction in the diameter of the core.

Figure 3:
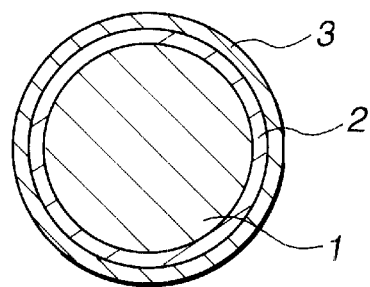
FIG. 3 is a cross-sectional view of a golf ball according to one embodiment of the invention.
Figure 4:
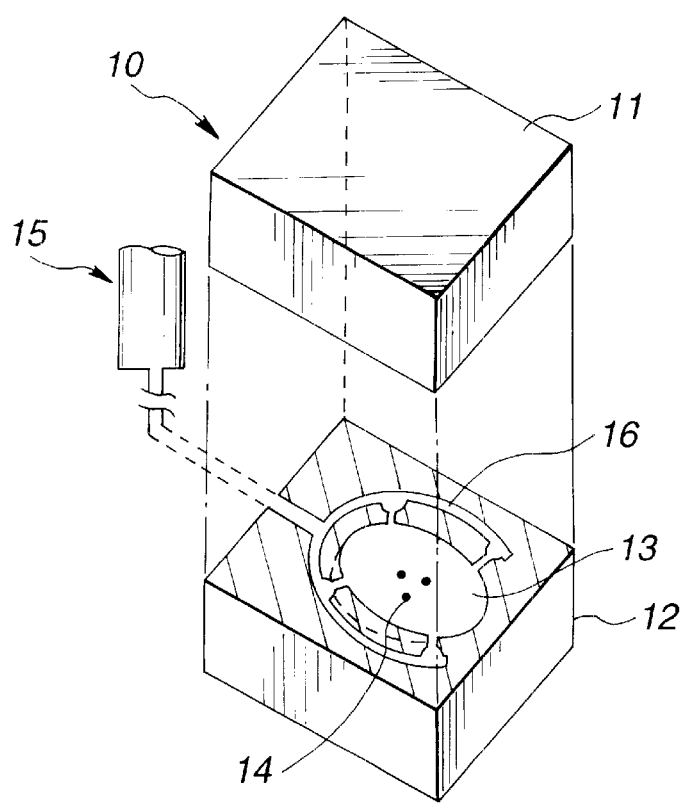
FIG. 4 is a schematic perspective view of an injection mold for molding an inner spherical layer in the same embodiment.

As shown in FIG. 3, the golf ball of this example had a core 1 made of cured butadiene rubber with a diameter of 38.3 mm (1.5079 in.), about which were provided an inner thin spherical layer 2 and an outer thin spherical layer 3. The inner layer 2 was made of an ionomer resin having a low modulus and a high resilience, and the outer layer 3 was made of a hard ionomer resin having a high modulus and excellent durability to wear and cracking. The thickness of the inner layer 2 was set at 1.2 mm (0.0472 in.), and the thickness of the outer layer 3 was set at 1.0 mm (0.0394 in.) as expressed by the distance from the outer surface of the inner layer to the outer surface of the ball except dimples. As shown in FIG. 4, the core 1 was placed within a vertically split injection mold 10 for the inner layer having upper and lower mold halves 11 and 12, each with a hemispherical cavity 13 defined by the inner face thereof, so as to be supported on three retractable pins 14 provided at the top and bottom the respective cavities. The gap between the outer peripheral surface of the core 1 and the inner peripheral face of the mold 10 was set at 1.2 mm (0.0472 in.). Ionomer resin for the inner layer was heated and melted within an injection cylinder 15 of a conventional vertical injection machine, passed through a suitably designed runner system 16, and injected into the gap simultaneously from several nozzles along the periphery of the mold parting line. Using the fill speed formula selected from FIG. 1 based on the melt flow rate value of 2 measured for the inner layer material, and substituting 1.2 mm (0.0472 in.) for the thickness t of the inner layer, $$V_1 \geq 109.4/(1.2)^2 - 1.8 = 74.2 \text{ cm}^3/\text{s} \ (4.5280 \text{ in}^3/\text{s}),$$

and so the injection speed of the injection machine, or the fill speed $V_1$ (cm$^3$/s), was set at 75 cm$^3$/s (4.5768 in$^3$/s).

Next, the core body obtained by uniformly covering the core 1 with the inner layer 2 having a thickness of 1.2 mm (0.0472 in.) was disposed within a vertically split injection mold for the outer layer using the same mechanism as in the inner layer injection mold 10 described above. Ionomer resin for the outer layer was simultaneously injected from several nozzles along the periphery of the mold parting line into the gap between the inner face of the mold and the outer surface of the core body by means of an injection machine, thereby molding the desired golf ball. Using the fill speed formula selected from FIG. 1 based on the melt flow rate of 10 measured separately for the outer layer material (or using FIG. 2 to calculate the variables a and b in above formula (1) when the melt flow rate is 10), and substituting 1.0 mm (0.0394 in.) for the thickness t of the outer layer, $$V_2 \geq 89.6/(1.0)^2 - 0.7 = 88.9 \text{ cm}^3/\text{s} \ (5.4250 \text{ in}^3/\text{s}),$$

and so the fill speed $V_2$ (cm$^3$/s) of the outer layer material at the time of injection was set at 90 cm$^3$/s (5.4921 in$^3$/s).

Using the method just described, a good cover composed of thin inner and outer spherical layers of uniform thickness and free of fill defects was successfully molded.

The present invention makes it possible to reliably form thin spherical layers of uniform thickness, is able to readily accommodate thinner layers and multiple layers in golf ball covers, and avoids reducing the core diameter, thereby offering potential for further improvements in golf ball performance. Moreover, the invention optimizes the injection conditions using the simple parameters of thin cover layer thickness, and the melt flow rate and fill speed of the thin cover layer material, resulting in excellent molding characteristics. The invention facilitates the mass production of golf balls having thin spherical cover layers of uniform thickness.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball comprising; a core and a cover enclosing the core, said cover having at least one thin spherical layer with a uniform thickness of not more than 1.0 mm formed by injection molding a material satisfying formula (1):

$$V \geq (a/t^2) - b \tag{1}$$

wherein V is an injection molding material fill speed in cubic centimeters per second, t is a thickness of said at least one spherical layer in millimeters, a=0.04M$^2$–3.75M+137.5, and b=–1.49/M–0.57, and M is a melt flow rate in grams per 10 minutes at 190° C. of the injection molding material for said at least one thin spherical layer.

2. The golf ball of claim 1, wherein the melt flow rate of the injection molding material for said at least one thin spherical layer is from 0.5 to 50 g/10 min.

3. The golf ball of claim 1, wherein said at least one thin spherical layer has a thickness of at least 0.8 mm.

* * * * *